Aug. 24, 1954 N. A. MacLEOD 2,687,213
FROTH FLOTATION PROCESS AND APPARATUS
Filed Jan. 7, 1952 8 Sheets-Sheet 2
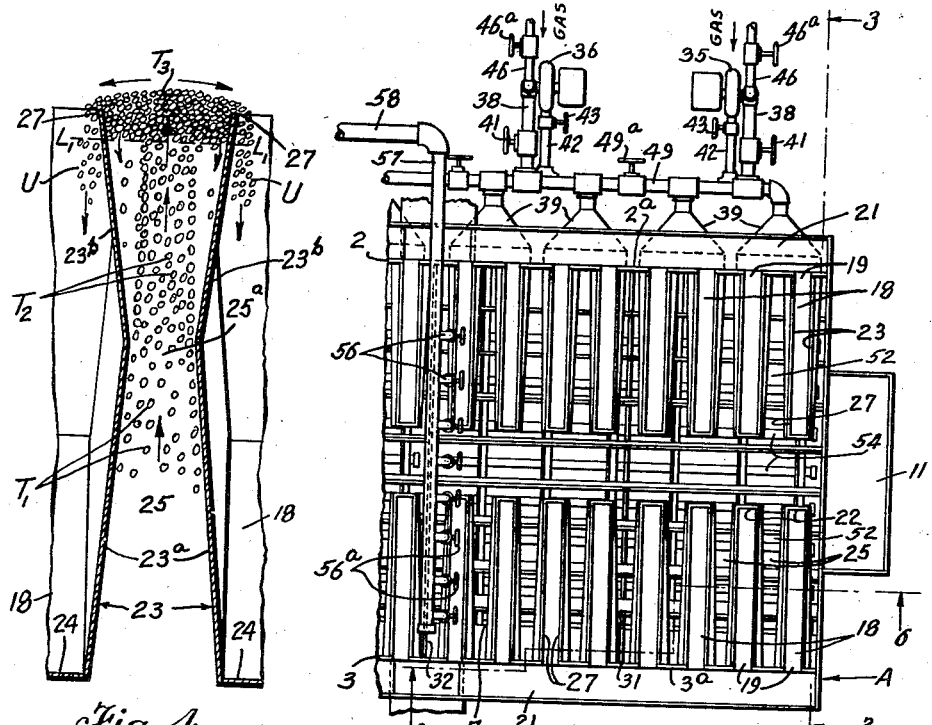
Fig. 2.
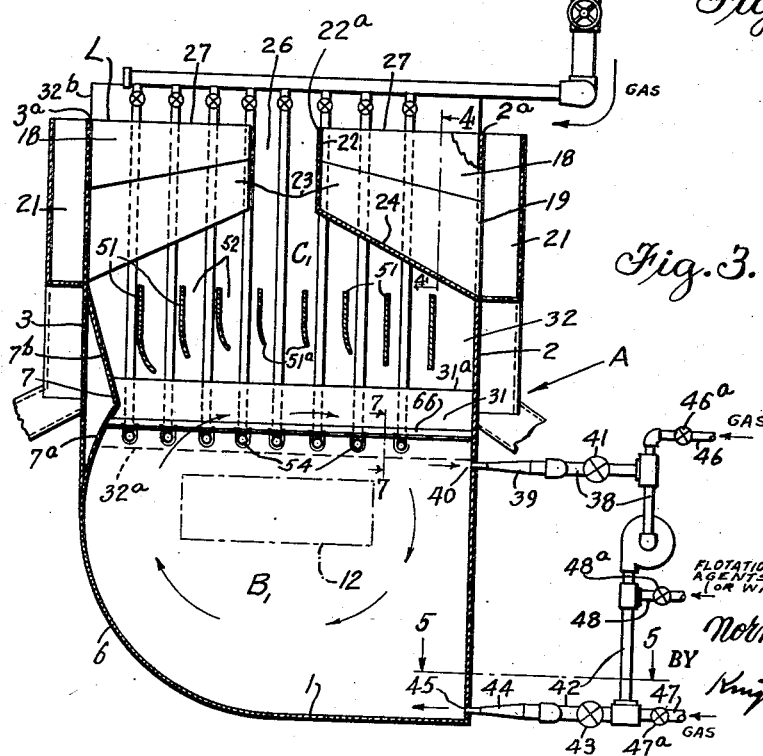
Fig. 4.
Fig. 3.
INVENTOR.
Norman A. MacLeod
BY
Knight & Rodgers
ATTORNEYS

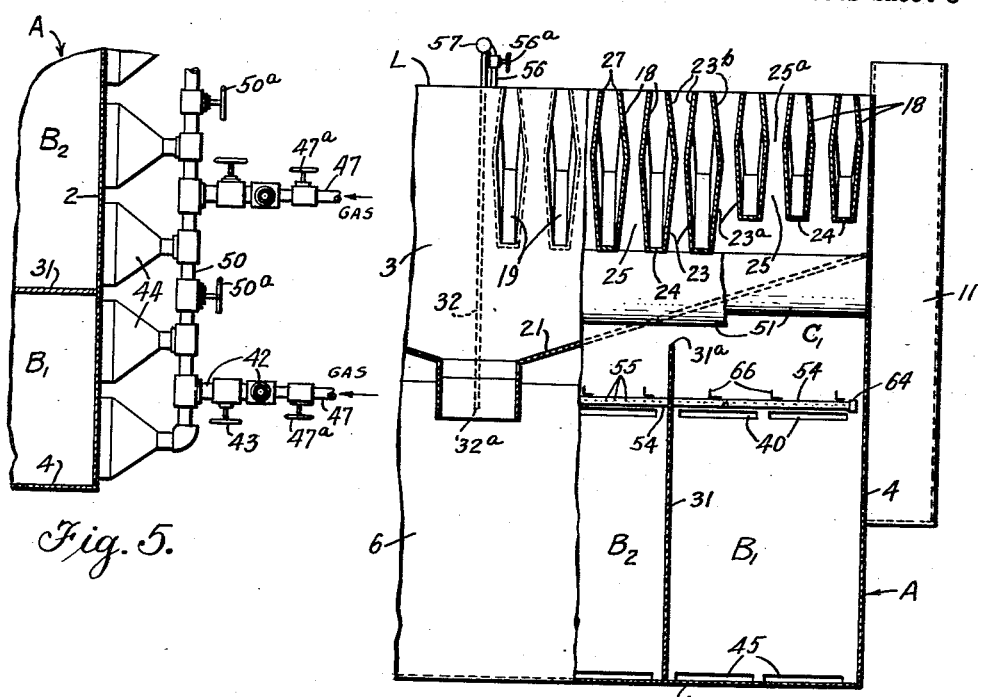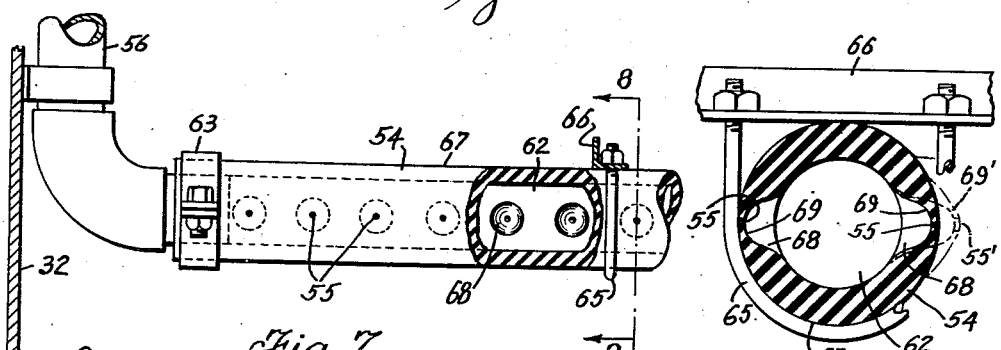

INVENTOR.
Norman A. MacLeod
BY
ATTORNEYS

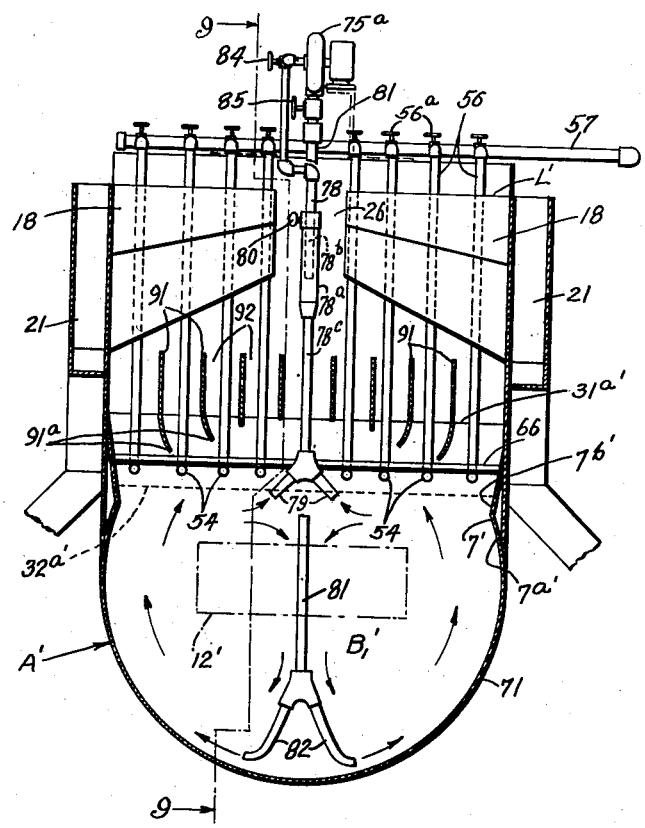
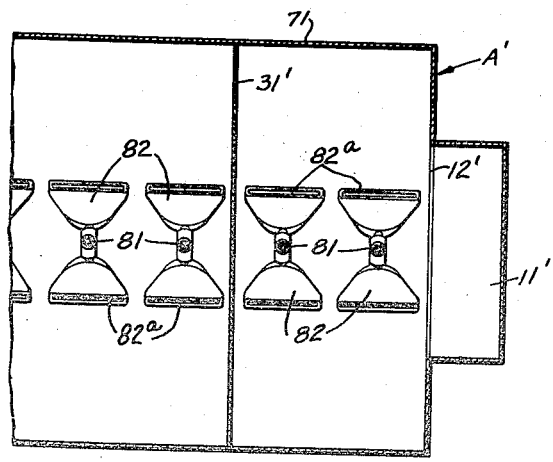

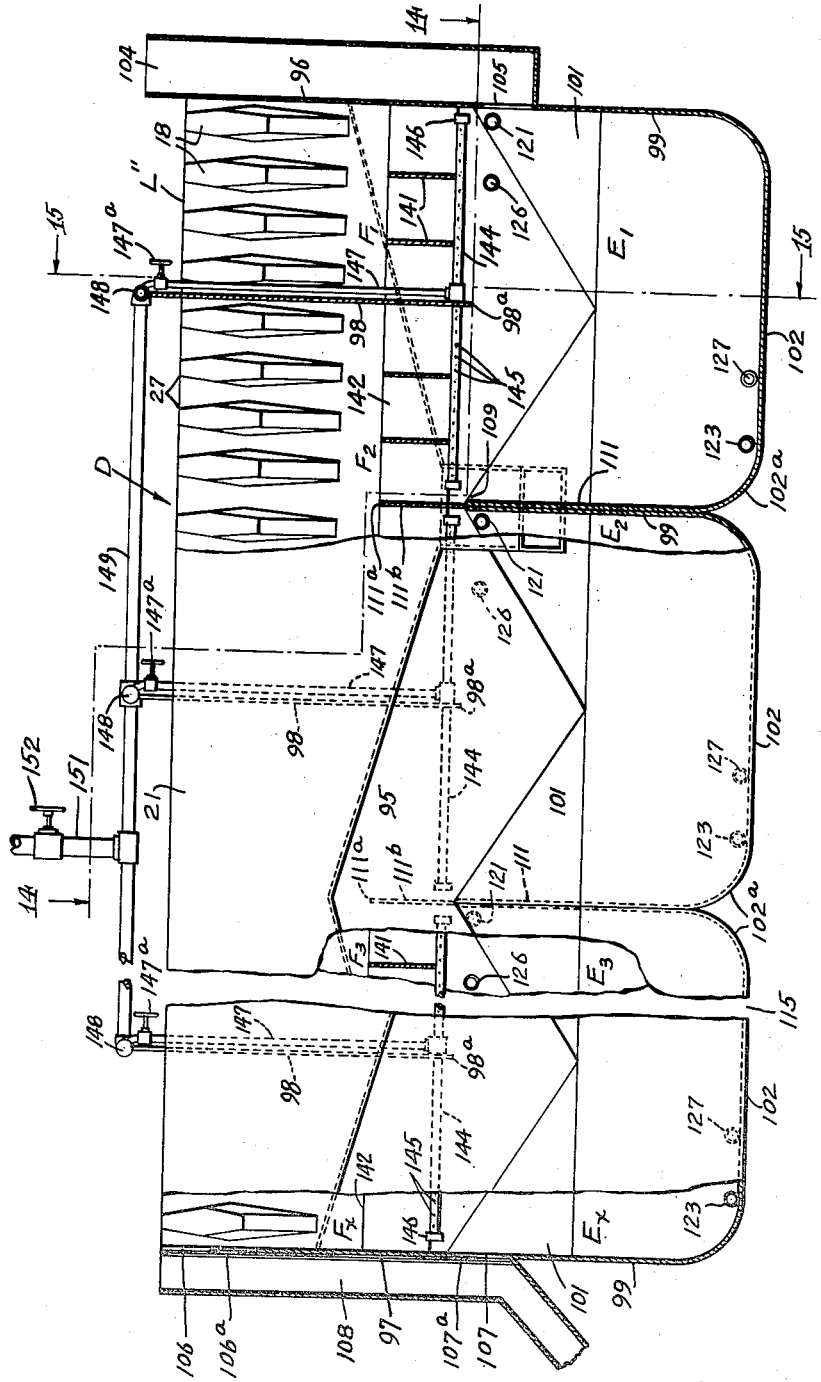

Aug. 24, 1954 N. A. MacLEOD 2,687,213
FROTH FLOTATION PROCESS AND APPARATUS
Filed Jan. 7, 1952 8 Sheets-Sheet 7

INVENTOR.
Norman A. MacLeod
BY
ATTORNEYS.

Patented Aug. 24, 1954

2,687,213

UNITED STATES PATENT OFFICE 2,687,213

FROTH FLOTATION PROCESS AND APPARATUS

Norman A. MacLeod, Altadena, Calif.

Application January 7, 1952, Serial No. 265,345

15 Claims. (Cl. 209—164)

This invention relates to a process and apparatus for concentrating ores, minerals or other materials by froth flotation, in which a body of pulp containing ore or other solids in divided condition, suspended in water, is subjected to agitation and aeration for the purpose of forming a multiplicity of small gas bubbles dispersed in the pulp and causing selective attachment of certain solid particles to the gas bubbles. The gas bubbles and attached solid particles rise through the pulp to form a froth containing desired solid constituents, which is removed as a concentrate at the top of the body of pulp.

The term "aeration" is used herein to mean the distribution of a multiplicity of small bubbles of gas within a body of pulp to permit attachment thereto of certain solid particles whose surfaces may be coated by a suitable agent or combination of agents such as are commonly used in froth flotation. Although air is commonly used for producing these bubbles, it will be understood that any suitable gas may be employed.

This application is a continuation-in-part of my application Serial No. 113,783, filed September 2, 1949.

The principal object of the invention is to provide a froth flotation process and apparatus embodying advantageous steps or means for subjecting the pulp to agitation and aeration and to bubble separation and froth formation, whereby a large quantity of pulp can be treated during continuous flow through a single apparatus, with a highly efficient formation and recovery of a froth product or concentrate.

A particular object of the invention is to provide a froth flotation process and apparatus in which the agitation and aeration of the pulp and the separation of bubbles to form the froth may be controlled substantialy independently of each other, and in which the pulp is caused to flow alternately through successive zones or regions of agitation and aeration and through successive zones or regions of bubble separation and froth formation above the agitation zones.

A further object is to provide a process and apparatus in which the agitation of the pulp and the formation of the froth may be controlled in such manner as to maintain a different proportion of solids in the pulp during agitation and aeration and during the separation of bubbles to form the froth. A particular object is to provide for maintaining a relatively high percentage of solids in the agitation zone so as to reduce the tendency of solid particles to settle out, and also increase the scrubbing action on mineral particles and provide better exposure of the surfaces thereof for contact with and for adhesion to added flotation reagents, and to provide a relatively low concentration of solids in the pulp during the rising of the gas bubbles with attached solid particles and formation of the froth so as to facilitate the rising of the gas bubbles and attached solids and the formation of the froth, and to also promote the gravity settling or dropping out of solid particles that are not attached to gas bubbles. A further advantage that may be gained by maintaining a high proportion of solids in the agitation zone is that desired flotation reagents may be introduced in that zone with resulting improvement in action due to the high concentration of reagent in the liquid phase and its ready availability to the high proportion of solids present.

A further object is to provide for a general linear flow of pulp through a flotation apparatus from one end to the other, while repeatedly subjecting the pulp during such flow to successive stages of agitation and aeration and to successive stages of bubble separation and froth formation, and to produce active circulation of the pulp in each stage of agitation and aeration, preferably in a localized path transverse to the direction of the general linear flow of the pulp.

A further object is to provide for agitating the pulp in the presence of air to produce aeration of the pulp and suspension of solid particles therein and to promote contact of the solid particles with the gas bubbles, by withdrawing a portion of the body of pulp at one position by pump action and reintroducing it by the same action into the body of pulp at another position, in such manner and at such velocity as to cause active circulatory motion and agitation in the body of pulp. By changing or properly selecting the relative height of the withdrawal and reintroduction of the pulp, in relation to the overall depth of the pulp, the concentration of solids in the agitation zone may be controlled as desired, which is sometimes of importance for certain purposes.

A further object of the invention is to obtain suspension and agitation of solids in a liquid flotation medium or pulp by continually withdrawing a portion of the pulp, at a position preferably above the bottom of a body of pulp in a tank but below the pulp level, and continually re-introducing the withdrawn pulp forcibly into the pulp body, at or closely adjacent the bottom thereof, preferably substantially parallel to the bottom wall of the tank. In this connection, a particular object is to provide for controlling the concentration of solids in the pulp thus subjected to agitation, by changing or properly selecting the height at which the pulp is withdrawn, with respect to the position at which it is re-introduced and the overall depth of the pulp body.

A further object of the invention is to minimize the consumption of air or other gas by introducing only the amount of gas required for bubble formation and the production of a froth, and providing pump means for effecting active agitation and circulation of the pulp to maintain the solids in suspension and promote contact thereof with the gas bubbles and added flotation reagents.

A further object is to provide for maintaining a high proportion of solids in suspension in an agitation zone in the lower portion of a body of pulp, by the continual withdrawal and forcible reintroduction of pulp, and for maintaining a relatively low proportion of solids in a bubble separation and froth formation zone above the agitation zone, while introducing air into the agitation zone, preferably in the upper part thereof, to cause aeration and rising of gas bubbles with resulting formation of froth in the bubble separation and froth formation zone where the concentration of solids is relatively low.

A further object is to provide an apparatus in which the pulp is caused to flow, by gravity, alternately through a plurality of successive agitation zones in the lower part of a horizontally elongated tank and a plurality of successive bubble separation and froth formation zones in the upper part of the tank, and in which the pulp is subjected in each agitation zone to active agitation in the presence of gas to cause aeration of the pulp and contact of solid particles with gas bubbles, and is subjected in each bubble separation and froth formation zone to a minimum amount of agitation other than that caused by the general flow of the pulp longitudinally of the tank, so as to facilitate the rising and separation of the bubbles and attached solid particles and the settling or dropping out of solid particles that are not attached to gas bubbles.

Another object of the invention is to provide advantageous means for the removal of froth from the froth formation zones, and particularly to provide for the efficient removal of a relatively large quantity of froth per unit length of the apparatus so that, when handling large quantities of pulp in a single apparatus, the froth overflow capacity may be commensurate with the capacity of the apparatus to produce froth by agitation and aeration of the pulp. A further object in this connection is to provide froth overflow means that have extended overflow lips at the froth overflow level, and that are so arranged as to cause a positive flow of froth laterally toward and over the overflow lips and thus effect complete and positive discharge of a froth of high quality.

Other objects and advantages will be mentioned hereinafter or will be apparent from the following description, reference being made to the accompanying drawings, in which:

Fig. 2 is a partial plan view of the form of apparatus shown in Fig. 1, showing only the portion adjacent the feed end thereof;

Fig. 3 is a transverse vertical section on line 3—3 in Fig. 2;

Fig. 4 is an enlarged fragmentary sectional view showing portions of two adjacent froth discharge troughs, taken on line 4—4 in Fig. 3;

Fig. 5 is a fragmentary horizontal section on line 5—5 in Fig. 3;

Fig. 6 is a partial longitudinal section on line 6—6 in Fig. 2;

Fig. 7 is an enlarged view on line 7—7 in Fig. 3 showing a preferred form of gas delivery pipe in accordance with the invention;

Fig. 8 is a transverse sectional view on line 8—8 in Fig. 7, on a still more enlarged scale;

Fig. 11 is a transverse vertical section on line 11—11 in Fig. 9;

Fig. 12 is a horizontal sectional view on line 12—12 in Fig. 9;

Fig. 13 is a partly sectional side elevation of another modified form of apparatus according to my invention;

Figure 16:
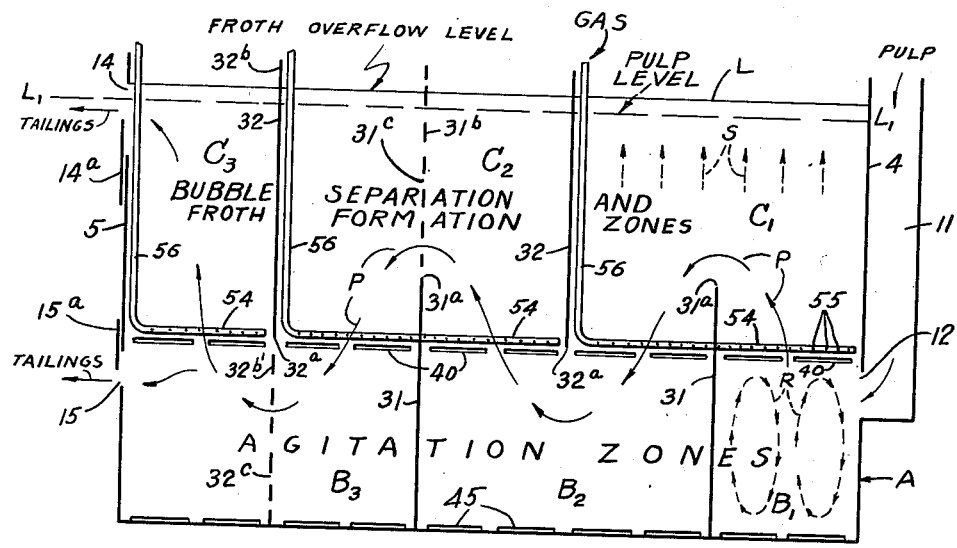
Fig. 16 is a schematic longitudinal vertical section of an apparatus of the type shown in Fig. 1, with certain parts omitted.

The flotation apparatus shown in Figs. 1 through 8 and illustrated schematically in Fig. 16 comprises a horizontally elongated tank indicated at A, having a bottom wall 1, side walls 2 and 3, and end walls 4 and 5 at the feed and discharge ends respectively. One side wall 2 extends vertically from the top of the tank to the bottom wall 1. The other side wall 3 extends vertically downward from the top of the tank to a position somewhat above the bottom and is joined to the bottom wall 1 by a wall portion 6 of generally cylindrical curvature which forms part of both the side and bottom walls. Above the curved wall portion 6 an auxiliary wall member 7 is provided, extending the length of the tank inside the side wall 3, whose lower portion 7a is curved or inclined inward and upward as an upward continuation of the curved wall portion 6, and whose upper portion 7b slopes outward and upward to the side wall 3.

Figure 1:
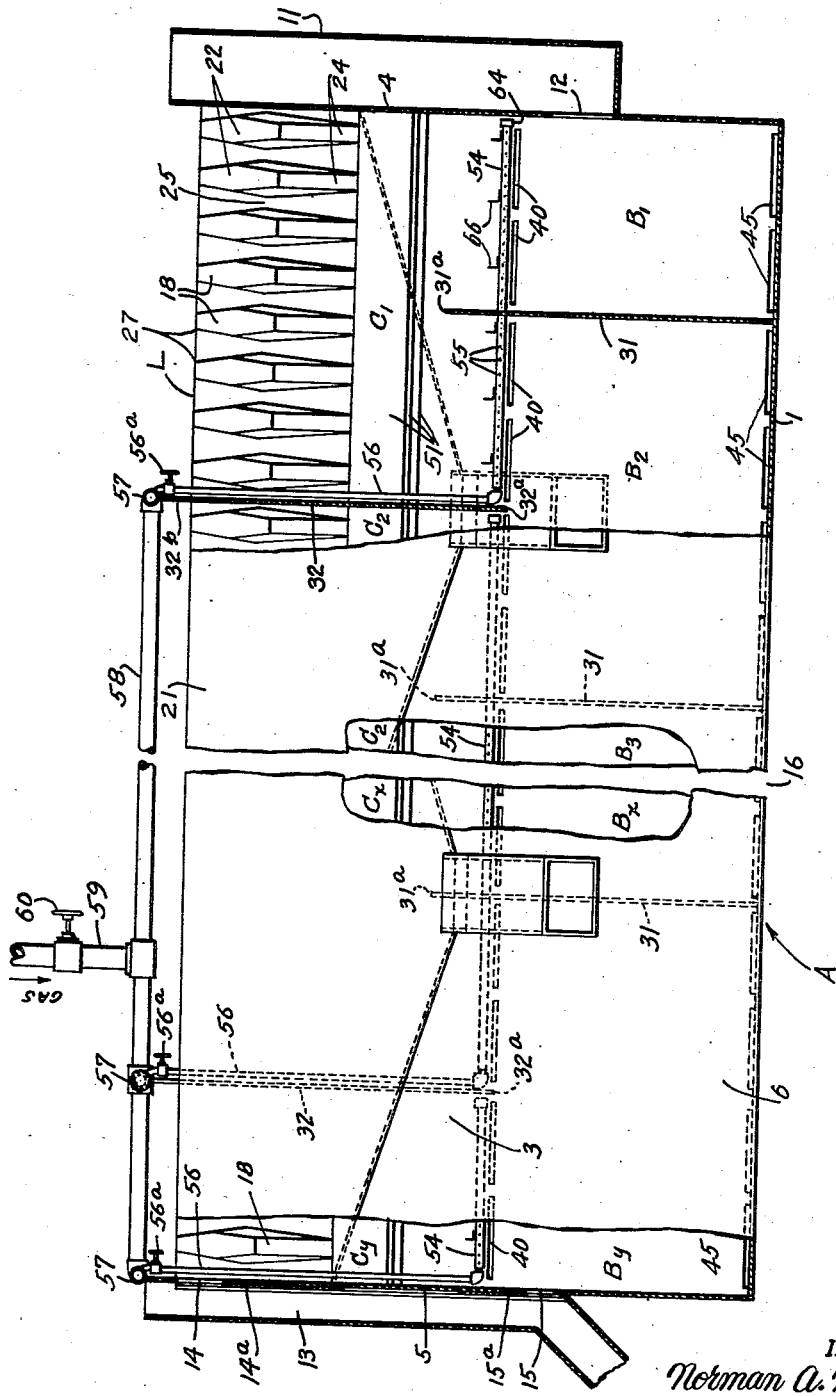
Fig. 1 is a partly sectional side elevation of one form of apparatus in accordance with this invention.
Figures 9, 10:
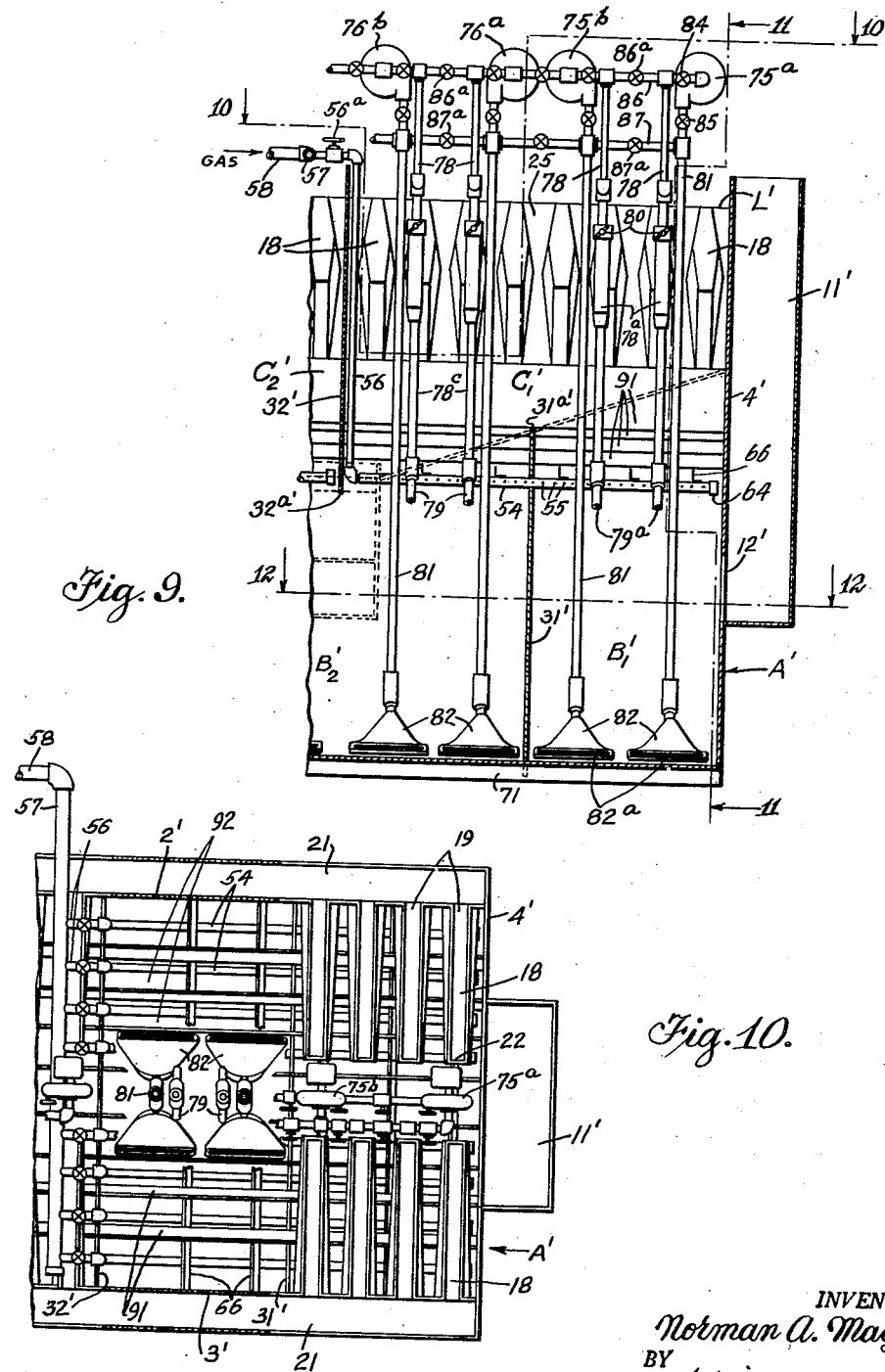
Fig. 9 is a partial longitudinal vertical section of another form of apparatus in accordance with this invention, taken on line 9—9 in Fig. 11.
Fig. 10 is a partly sectional plan view on line 10—10 in Fig. 9.

The tank A is provided at the feed end with pulp feed means comprising a feed compartment 11 open at its upper end for introduction of pulp and communicating with the interior of the tank through an inlet opening 12 in the end wall 4, located centrally of the tank and preferably in the lower portion but somewhat above the bottom thereof, as shown in Fig. 1 and in dot-dash lines in Fig. 3.

A tailings discharge compartment or launder 13 is provided at the discharge end of the tank, into which the tailings (i. e., the portion of the pulp that is not floated and removed in the froth) pass by overflowing a vertically adjustable gate 14a located adjacent a centrally located tailings discharge opening 14 in the upper portion of end wall 5. Another tailings discharge opening 15 controlled by a vertically adjustable gate 15a may also be provided below the overflow opening 14, for discharging a portion of the tailings from the tank at a lower level into the compartment 13.

The upper edge of the overflow gate 14a defines a tailings overflow lip located near the top of the tank for maintaining within the tank a pulp level slightly below the froth overflow level L defined by the froth overflow lips described hereinafter. At least part of the tailings are caused to overflow the top of gate 14a, and the desired pulp level may therefore be established and maintained by vertical adjustment of said gate. The term "pulp level" as used herein means the level at which the unhindered upward movement of individual gas bubbles or aggregates of bubbles due to displacement by the liquid phase substantially ceases, and the bubbles separate from the liquid. Above this level the gas bubbles are collected in the form of a froth, through which liquid drains back into the pulp or liquid phase without producing any appreciable upward displacement of the bubbles.

The construction of my invention is particularly intended and adapted for use in apparatus of relatively large size so as to handle a large quantity of pulp in a single machine, although the invention is not limited to any specific dimensions or proportions. In an apparatus of large capacity, for example, the transverse width of the tank, between the side walls 2 and 3, may be in the neighborhood of ten to twelve feet or more, and the height thereof, from the bottom wall 1 to the froth overflow level L at the top of the tank, may be in the neighborhood of fifteen to eighteen feet or more. Such dimensions make it possible, for example, to treat as much as 30,000 tons of ordinary copper ore per day, resulting in great improvements such as economy of power, increased extraction of valuable minerals, lower labor cost, and lower capital investment. However, machines of smaller size can also be used advantageously for treating smaller tonnages. In order to provide sufficient time for treatment of the pulp and separation of the froth during the generally longitudinal flow of the pulp through the tank from the inlet opening 12 to the tailings discharge openings 14 and 15, the tank may be of any suitable proportionate length, as indicated by the break therein at 16 in Fig. 1. For example, if the transverse dimensions are within the ranges mentioned above for large capacity machines, the length of the tank may be from fifty to two hundred feet or more, depending on the rate of flow of pulp and the treatment time required.

In order to provide a large froth overflow capacity and thus secure a satisfactory quality and rate of separation and removal of froth in a machine of large through-put capacity, the froth discharge means in such large machines preferably comprises a plurality of longitudinally spaced froth-receiving troughs 18 extending transversely of the tank in the upper portion thereof. The troughs 18 are arranged in two sets extending inward from the respective sides of the tank and communicate at their outer ends, through openings 19 in the respective side walls, with sloping froth discharge launders 21 extending along the sides of the tank. The troughs 18 extend within the pulp in the tank and extend downward to positions below the pulp level. Each froth receiving trough comprises an inner end wall 22, spaced side walls 23 and a bottom wall 24 sloping downward and outward to the bottom of the opening 19 as shown in Fig. 3.

The side walls of adjacent troughs are spaced from each other to provide passages 25 therebetween for upward movement of gas bubbles through the pulp and formation of froth, as illustrated in Fig. 4 and described more fully hereinafter. Upward movement of gas bubbles and formation of froth is also permitted in the central portion of the tank between the opposing inner ends of the respective sets of troughs, as indicated at 26 in Fig. 3.

The trough side walls 23 terminate at their upper ends in horizontal froth overflow lips 27 extending transversely of the tank at the froth overflow level L mentioned above, and the removal of froth takes place principally by overflow over these transversely extending lips, although some froth can overflow over the upper edges 22a of the inner end walls 22 and over the upper edges 2a and 3a of the side walls 2 and 3 between adjacent troughs, which are also located at the overflow level L. It will be seen that this arrangement provides a relatively great total length of overflow lips per unit length of the tank, thus providing for the removal of a large quantity of froth at a given desired level.

For most satisfactory separation of gas bubbles and formation and removal of the froth, the lower portions of the side walls 23 of each trough are preferably inclined outward slightly as shown at 23a in Figs. 4 and 6, from the bottom of the trough upward to an intermediate position, and the upper portions thereof are preferably inclined inward slightly as shown at 23b, from this intermediate position upward to the overflow lips 27. As a result of this construction it will be seen that the spaced side walls of two adjacent troughs, which define the passages 25 for upward movement of bubbles and formation of froth, converge upwardly from their bottom edges to a somewhat restricted throat 25a intermediate the height of the troughs and below the level of the pulp in the tank, and then diverge upwardly from this restricted throat to the overflow lips at their upper edges.

Within the lower portion of the tank I provide a plurality of longitudinally spaced substantially imperforate transverse lower partitions 31, each extending across the width of the tank between the side walls and extending upward from the bottom of the tank to an intermediate level spaced a substantial distance below the froth overflow level L. These lower partitions 31 divide the lower portion of tank A into a plurality of successive pulp agitation chambers as indicated at $B_1$, $B_2$, $B_3$—$B_x$, $B_y$ in Fig. 1. In Figs. 1, 3 and 6, the upper edges 31a of these lower partitions are shown at an intermediate level below the bottoms of the froth receiving troughs 18 and a substantial distance below the level of the tailings overflow lip defined by gate 14a. Since the partitions 31 are substantially imperforate below this level, the pulp is caused to pass over the partitions in flowing from each agitation chamber to the next, but the upper edges 31a are sufficiently below the pulp level so that this longitudinal movement of the pulp over these partitions occurs principally in the intermediate portion of the tank below the troughs 18 and hence does not disturb the upward movement of the gas bubbles and the formation and removal of the froth.

Within the upper portion of the tank I provide a plurality of complementary substantially imperforate transverse upper partitions 32 that divide that portion of the tank into a plurality of successive bubble separation and froth formation chambers as indicated at $C_1$, $C_2$—$C_x$, $C_y$ in Fig. 1. These upper partitions are spaced longitudinally of the tank intermediate, and preferably substantially midway between, the lower partitions 31. Each of the partitions 32 extends across the width of the tank between the side walls and extends from the froth overflow level L downward to an intermediate position, preferably within the agitation chamber between each pair of adjacent imperforate lower partitions. Thus, in Figs. 1, 3 and 5, the lower edges 32a of the upper partitions are located at a level somewhat below the upper edges 31a of the lower partitions. Since the partitions 32 are substantially imperforate above this level, the pulp is caused to pass beneath the partitions in flowing from each bubble separation and froth formation chamber to the next, and is thus positively directed into and through a pulp agitation chamber, as described more fully hereinafter. The upper portions 32b of partitions 32 and the upper edge portions of end walls 4 and 5 preferably extend upward a short distance above the froth overflow level L, so as to prevent flow of froth over the tops of these partitions and end walls.

In the particular form of apparatus shown, the upper partitions 32 are spaced at equal intervals between the end walls 4 and 5, except that the interval between the last partition and end wall 5 is only half as great as the other intervals, so that the successive bubble separation and froth formation chambers $C_1$, $C_2$—$C_x$ are of equal length in the direction of general longitudinal flow of the pulp, but the last chamber $C_y$ is half the length of the others. The first of the series of lower partitions 31 is disposed respectively midway between the first upper partition and end wall 4, and the remaining lower partitions are spaced equally between this first partition and end wall 5, midway between the successive upper partitions, so that the first pulp agitating chamber $B_1$ is half the length of each of the remaining chambers $B_2$—$B_y$. If the transverse dimensions of the tank are within the ranges given above, for example, the length of each of the half-length chambers $B_1$ and $C_y$ may be about five to six feet or more, and the length of each of the other pulp agitation and froth separation chambers may be about ten to twelve feet or more.

The apparatus may be considered as comprising a plurality of successive sections or cells whose upper portions are separated by the partitions 32. Thus, the upper portion of each section forms a corresponding bubble separation and froth formation chamber such as $C_1$, while the lower portion of each section except the last is divided by the corresponding lower partition 31 into two agitating zones each half the length of the section, the adjoining agitating zones of each two adjacent sections being in open communication with each other below one of the partitions 32, to form a single agitation chamber such as $B_2$.

The apparatus further comprises means for agitating the pulp in each agitation chamber in the presence of air or other gas, to thoroughly aerate the pulp. The pulp agitating means preferably comprises suitable pumps including at least one pump for each agitation chamber, connected thereto in such manner as to withdraw pulp therefrom and to return it thereto at such position and velocity and in such direction as to maintain active circulation of the pulp in the chamber and suspension of the solid particles in the liquid.

As shown particularly in Figs. 2 and 3, this particular form of apparatus is provided with a series of pumps arranged along one side of the tank, outside the side wall 2, the first two such pumps being indicated at 35 and 36 in Fig. 2. The first pump 35 is connected to the first agitation chamber $B_1$. The second pump 36 is connected to the first half of the second agitation chamber $B_2$, between the first pair of partitions 31 and 32. It will be understood that a similar pump is connected to the second half of the second chamber $B_2$, between the first partition 32 and the next partition 31, and that two such pumps are similarly provided for each succeeding agitation chamber $B_3$—$B_y$.

All the pumps are connected in the same manner to the corresponding agitation chambers, and the following description of pump 35 and its associated piping and connections will therefore apply also to each of the other pumps.

The pump 35 is connected to agitating chamber $B_1$ by a pipe system through which it continually withdraws pulp therefrom at one position and returns it thereto at another position. This pipe system comprises a pulp withdrawal line 38 connected to the pump inlet and connected to the tank A by two flared branch connections 39 opening into the chamber $B_1$ through pulp withdrawal openings 40 in the side wall 2 located at a substantial distance above the bottom of the chamber and preferably in the upper portion thereof but a substantial distance below the level of the tailings overflow lips defined by gate 14a. As shown in Fig. 1, the openings 40 are elongated horizontally and longitudinally of the tank so as to withdraw pulp from substantially the entire length of the chamber $B_1$. In the particular construction shown, the openings 40 are located at approximately the same level as the lower edges of the upper partitions 32. The pulp withdrawal line 38 is provided with a valve 41.

The pipe system of pump 35 further comprises a pulp return line 42, also provided with a valve 43, connected to the pump outlet and connected to the tank A by two flared branch connections 44 opening into the lower portion of chamber $B_1$ through pulp return openings 45 in the side wall 2, preferably in a substantially horizontal direction transversely of the tank and closely adjacent the bottom wall 1 so as to direct the returned pulp across the bottom of the chamber and toward the curved wall portion 6 at the opposite side of the chamber. The openings 45 are also elongated horizontally and longitudinally of the tank so as to introduce pulp into substantially the entire length of chamber $B_1$.

Gas supply pipes 46 and 47, controlled by valves 46a and 47a and connected to a source of compressed air or other gas at suitable pressure, are shown connected to the pulp withdrawal and return lines 38 and 42 respectively, for introducing gas into the pulp either ahead of or beyond the pump or both.

I also prefer to provide means for introducing any desired flotation agents into the pulp in each agitation chamber, and such means may advantageously comprise a flotation agent supply pipe connected to the piping system of each pump. For example, I have shown in Fig. 3 a pipe 48, controlled by a valuve 48a, connected to the pulp return line 42 of pump 35. The pipe 48 may be connected to a source of supply of a flotation agent or agents in liquid form or in solution in water, at suitable pressure to overcome the pump outlet pressure and thereby continually introduce a controlled proportion of the flotation agent into the pulp in line 42. If desired, this pipe 48 may also be connected to a source of water under pressure, whereby a stream of water may be introduced at high velocity into chamber $B_1$ through the pulp return openings 45, for the purpose of dislodging and suspending solids that may settle and accumulate at the bottom of the chamber in the event of a prolonged shutdown while the tank is full of pulp.

Pipes 49 and 50 having normally closed valves 49a and 50a, may be provided interconnecting the pulp withdrawal lines 38 and the pulp return lines 42, respectively, of each pair of adjacent pumps. If it is desired to disconnect any one of the pumps for repair or other purpose, the valves 41 and 43 in the lines of that pump may be closed, and the valves 49a and 50a in the interconnecting pipes to an adjacent pump may be opened, so that such adjacent pump will then recirculate the pulp in the agitation sections normally served by both pumps. These interconnecting pipes also make it possible, if desired, to operate the pumps in such maner as to transfer part of the pulp withdrawn from one section of the agitation chambers to an adjacent section either upstream or downstream therefrom with respect to the general linear flow of pulp longitudinally of the apparatus. For example, if either valve 41 or 43 in the lines of one pump is partially closed and the valve 49a or 50a in the corresponding connecting pipe to an adjacent pump is partially opened, the adjacent pump will either draw part of the pulp from the pulp withdrawal line 38 of the one pump and transfer it to the agitation section corresponding to the adjacent pump, or else deliver to the pulp return line 42 of the one pump part of the pulp withdrawn from the section corresponding to the adjacent pump.

As indicated in Fig. 1, all of the agitation chambers are provided with pulp withdrawal openings 40 and pulp return openings 45, as described above, and it will be understood that these openings are connected to the corresponding pumps in the same manner as described for chamber $B_1$. For example, it will be apparent from Figs. 1, 2 and 5 that the pulp withdrawal and return openings of the first half of the second chamber $B_2$ are similarly connected to the corresponding pump 36.

The continual withdrawal and reintroduction of pulp by the pumps and piping system described above maintains active circulation and agitation of the pulp in each agitation chamber. The circulatory movement of pulp within each chamber is principally in generally circular or annular paths transverse to the length of the tank, as indicated by the curved arrows in the chamber $B_1$ in Fig. 3, a portion of the circulating pulp being continually withdrawn through openings 40 and returned through openings 45. Thus the pulp circulates about an axis extending longitudinally of the tank and located substantially centrally of the agitation chambers, and the inner surface of wall portion 6 is preferably curved cylindrically about this central longitudinal axis of circulation.

Above the agitation chambers but below the pulp level in the tank and at a substantial distance below the froth overflow level L, I provide a plurality of spaced vertically extending baffles 51. These baffles, which are preferably disposed in the lower portion of each bubble separation and froth formation chamber such as $C_1$, below the froth overflow troughs 18 and above the lower transverse partitions 31, extend longitudinally of the tank A and perpendicular to the planes of the above described circulatory movement of the pulp in the agitation chambers. Gas bubbles with attached solid particles pass upwardly through the pulp in the spaces 52 between baffles 51 to form a froth in the upper portions of the bubble separation and froth formation chambers. The baffles intercept the circulatory motion of the circulating pulp in its path transverse to the length of the tank, so as to maintain a relatively quiescent condition in the liquid between and above the baffles and thereby facilitate rising of bubbles and formation and removal of froth. The lower edge portions 51a of some of the baffles 51 are shown as being curved or inclined in a downward direction toward the side of the tank at which the pulp is withdrawn and returned by the pumps, so as to be substantially perpendicular or normal to the annular paths of circulator motion of the pulp, and thus minimize the tendency for the circulating pulp to be diverted upward by the baffles. Since the baffles extend longitudinally of the tank, they do not interfere with or obstruct the longitudinal flow of pulp through the bubble separation and froth formation chambers and above the partitions 31, in passing from one agitation chamber to the next.

The apparatus also includes means for introducing air or other gas into the pulp at a plurality of distributed positions in the tank at an intermediate level therein, at a substantial distance below the pulp level and preferably in the upper portion of each agitation chamber $B_1$, $B_2$ etc., under sufficient pressure to cause gas bubbles to enter the pulp. Such gas introducing means is shown as comprising a plurality of transversely spaced gas delivery pipes 54 extending longitudinally across substantially the entire length of the agitation chambers. In the particular construction shown, a set of gas delivery pipes 54 is provided beneath each bubble separation and froth formation chamber, below the longitudinal baffles 51 and adjacent but slightly above the level of the pulp withdrawal openings 40 and the lower edges of the upper partitions 32. Each set of pipes 54 extends from one of the upper partitions 32 to a position adjacent the next upper partition or one end wall of the tank, passing through openings in the intervening lower partition 31. The openings in the lower partition may if desired be sealed in any suitable manner to prevent undesired passages of pulp therethrough. The pipes 54 of each set are distributed across substantially the entire width of the agitation chambers served thereby, as shown in Fig. 3.

Each of the gas delivery pipes 54 is provided with a plurality of small gas outlet openings 55 spaced at suitable intervals along the length thereof, and is connected at one end by a vertical pipe 56 extending upward to a position above the top of the tank, where it is connected through a control valve 56a to a gas supply pipe 57 extending across the top of the tank. The several gas supply pipes 57 are connected by a pipe 58 to a main gas supply line 59 which is preferably provided with a shut-off valve 60 and is connected to a source of air or other gas at suitable pressure, such as a compressor or receiver, not shown.

A preferred construction of the gas delivery pipes in accordance with my invention is illustrated particularly in Figs. 7 and 8, in which the pipe 54 is formed of a section or length of cylindrical tubing of rubber or other resilient and flexible material which is distensible or deformable outwardly by internal gas pressure. The length of tubing has an internal cylindrical bore 62 and is secured tightly at one end, as by clamp 63, to a nipple or other fitting at the lower end of the vertical pipe 56, the other end of the tubing being closed by a plug or cap 64 (Fig. 1) clamped or otherwise secured thereto. The resilient pipes may be supported by any suitable means such as U-shaped straps 65 supporting each pipe at suitable intervals and secured to supporting bars 66 which are supported at their ends on the side walls of the tank.

The gas outlet openings 55 are provided at suitable intervals along the length of the pipe, and are preferably arranged in two rows at the opposite sides of the cylindrical wall 67. The openings 55 are quite small, preferably so small as to be substantially closed in the absence of internal pressure, and are adapted to be enlarged significantly upon application of gas under pressure to the internal bore 62, due to outward deformation or distension of the resilient material of which the wall 67 is formed and also so small that the formation of small gas bubbles is promoted. Such openings may be formed, for example, by piercing the wall of the tube with a sharp pointed instrument, and are preferably small enough to result in formation of small gas bubbles even when enlarged significantly by the internal pressure. In order to cause increased outward deformation, under internal pressure, of the portions of the tubing wall immediately adjacent the openings 55, I prefer to form the wall 67 with an internal cup-shaped recess 68 surrounding each opening, so as to provide a marginal wall portion 69 immediately adjacent and around the opening, of materially less thickness than the remaining portions of the wall between these marginal portions. The internal gas pressure causes the marginal wall portion 69 to bulge outward and form a protuberance of generally spheroidal shape, as indicated in dot-dash lines at 69' in Fig. 8, having a radius of curvature considerably less than the radius of the tube, thus causing a substantial further decrease in thickness of this part of the wall and a substantially increased enlargement of the opening 55, as indicated at 55'.

The perforated gas delivery pipes 54 introduce gas into the pulp in the upper portion of each pulp agitating chamber, forming a multiplicity of small gas bubbles, and the agitation of the pulp causes these bubbles to be thoroughly distributed throughout the circulating pulp and brought into intimate contact with solid particles, with resulting attachment of those particles that tend to attach themselves thereto. The gas bubbles with the attached solid particles eventually rise to the top of the agitation zone and pass upwardly between the baffles 51 and through the overlying bubble separation and froth formation zone, where they accumulate to form a froth at the top of the pulp, and overflow the lips 27 into the troughs 18. The operation of this and other forms of apparatus shown will be described more fully hereinafter.

The modified form of apparatus shown in Figs. 9 through 12 comprises a tank A' generally similar to the tank A described above except for the cross-sectional shape of the lower portion. The tank A' has an upwardly and inwardly concave curved lower wall portion 71 forming the bottom wall and the lower portions of the side walls. The wall portion 71 is generally semi-cylindrical in shape, and is joined at its upper edges to vertical side walls 2' and 3' which extend up to the froth overflow level L'. Auxiliary wall members 7' extend the length of the tank within the side walls above the curved wall portion 71, with their lower portions 7a' inclined or curved inward and upward as upward continuations of the curved wall portion and their upper portions 7b' sloped outward and upward to meet the side walls 2' and 3', as shown in Fig. 11. Tank A' further comprises an end wall 4' at the feed end, and is provided with a pulp feed compartment 11' communicating with the lower portion of the tank through an opening 12' in said end wall.

Only a portion of the apparatus adjacent the feed end is shown in the drawings, but it will be understood that the tank A' may be of any desired length and is provided at the other end with another end wall and with tailings discharge means including means defining a tailings overflow lip, all as described above except that the other end wall is also modified in shape to conform to the cross-sectional shape of the tank.

The above comments regarding the number of successive chambers, the proportions of these chambers, the ability to handle a large quantity of material in a single machine, and the examples of dimensions that may be used in a large capacity machine, are also applicable to this form of apparatus.

The tank A' is shown as provided with froth overflow means similar to those described above, including transverse troughs 18 in the upper portion of the tank and side launders 21, and is also similarly provided with a plurality of longitudinally spaced lower partitions 31' dividing the lower portion of the tank into a plurality of successive pulp agitation chambers such as $B_1'$ and $B_2'$, and with a plurality of longitudinally spaced upper partitions 32' dividing the upper portion of the tank into a plurality of successive bubble separation and froth formation chambers such as $C_1'$ and $C_2'$. The lower edges 32a' of the upper partitions extend somewhat below the upper edges 31a' of the lower partitions, and the arrangement of these partitions is the same as described above except that the shape thereof is modified to conform to the shape of the tank.

In this form of apparatus the pulp circulating means comprises a series of pumps, preferably located above the tank A' as shown, with piping systems connected to the agitation chambers in such manner as to continually withdraw pulp therefrom and return it thereto, to maintain active circulation and agitation of pulp therein. At least one pump is provided for each agitation chamber. In this case also, the arrangement of the partitions 31' is assumed to be such that the first agitation chamber $B_1'$ is half the length of the remaining chambers, as described above. I have shown two pumps 75a and 75b connected to the first chamber $B_1'$. Four pumps may be provided for each remaining agitation chamber, the first two of these pumps for the chamber $B_2'$ being shown at 76a and 76b in Fig. 9. All of these pumps are connected to the corresponding agitation chambers in the same manner as described below for the pumps 75a and 75b.

The pipe system for each pump 75a and 75b comprises a pulp withdrawal line 78 connected to the pump inlet and extending downwardly into the tank and opening into the pulp agitation chamber $B_1'$ at a substantial distance above the bottom thereof, through pulp withdrawal openings 79a at the lower ends of two downwardly and outwardly inclined branch pipes 79 connected to the lower end of each line 78. The pulp withdrawal openings 79a preferably open into the upper portion of the agitation chamber, below the overlying bubble separation and froth separation chamber, and I have shown means for adjusting the level thereof, comprising an outer pipe section or sleeve 78a slidably connected to an inner pipe section 78b in each line 78, the branch pipes 79 being connected to sleeve 78a by pipe 78c. The section 78b extends downwardly within the sleeve 78a and suitable means such as a packing gland is provided for maintaining a liquid tight seal between section 78b and the upper end of sleeve 78a in all positions of vertical adjustment thereof. Sleeve 78a may be held in any desired position by means of a set screw 80. In the position shown, the pulp withdrawal openings 79a are located approximately at the level of the lower edges 32a' of the upper partitions 32', but they may be adjusted to higher or lower positions by movement of sleeve 78a, so as to vary the level at which pulp is withdrawn from chamber $B_1'$. However, the level of pulp withdrawal is in all cases below the bubble separation and froth formation chambers, and a substantial distance below the level of the tailings overflow lip.

The pipe system for each pump 75a and 75b further comprises a pulp return line 81 connected to the outlet of the pump and extending downwardly within the tank and provided at its lower end with two flared oppositely and outwardly directed delivery members 82 having pulp return openings 82a at their outer ends, opening into the lower portion of chamber $B_1$, preferably closely adjacent the curved bottom wall 71 and in directions substantially parallel thereto. The pulp return openings 82a are elongated horizontally and longitudinally of the tank so as to introduce pulp into substantially the entire length of chamber $B_1'$, in outward directions at opposite sides of the center thereof and toward the respective side portions of curved wall 71.

The lines 78 and 81 are provided with valves 84 and 85 respectively. The pulp withdrawal lines 78 and the pulp return lines 81 of each pair of adjacent pumps are interconnected by pipes 86 and 87, respectively, provided with normally closed valves 86a and 87a, in the same manner and for the same purpose as described above in connection with Figs. 1 to 8. It will be understood that these lines may also be provided with valved connections for introducing air or other gas, flotation agents and/or water thereto, in the same manner as described in connection with Figs. 1 to 8.

The arrangement of the pulp circulating means in this form of apparatus is such as to maintain active circulation of the pulp throughout each agitation chamber, due to the continual withdrawal of pulp by each pump through the corresponding pair of openings 79a in the upper portion thereof and the continual reintroduction of pulp, through the corresponding pair of pulp return openings 82a, outwardly and upwardly at the respective sides of the tank. The circulatory movement of pulp thus maintained is principally in two generally circular or annular paths transverse to the length of the tank and within the respective side portions thereof and about two axes extending longitudinally of the tank, as indicated by the curved arrows in the chamber $B_1'$ in Fig. 11.

This apparatus is also shown as provided with a set of vertical baffles 91 extending longitudinally of the tank and transverse to the circulatory motion of the pulp, above the agitation chambers but below the pulp level and at a substantial distance below the froth overflow level $L'$. These baffles are spaced from each other and from the side walls of the tank to provide passages 92 therebetween permitting upward movement of gas bubbles with attached solid particles and also permitting movement of pulp longitudinally of the tank from one agitation chamber to the next. The general arrangement and purpose of these baffles is comparable to the baffles 51 in the first described form of apparatus, and some of them are shown as similarly provided with curved lower edge portions 91a directed substantially perpendicular to the paths of circulatory movement of the pulp, for minimizing the tendency to divert the circulating pulp upwardly therebetween.

The apparatus is also provided with means for introducing gas into the pulp in the upper portion of each pulp agitation chamber, including perforated gas delivery pipes 54 constructed and arranged in substantially the same manner as previously described, and identified by the same reference characters.

Figure 14:
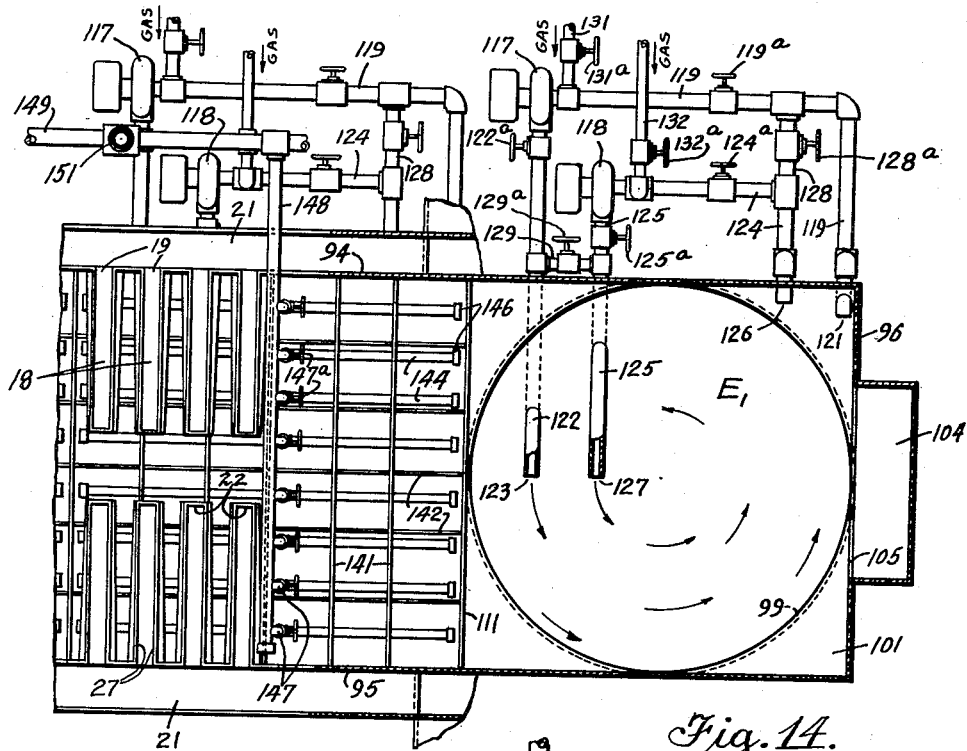
Fig. 14 is a partly sectional plan view of a portion of this form of apparatus on line 14—14 in Fig. 13.
Figure 15:
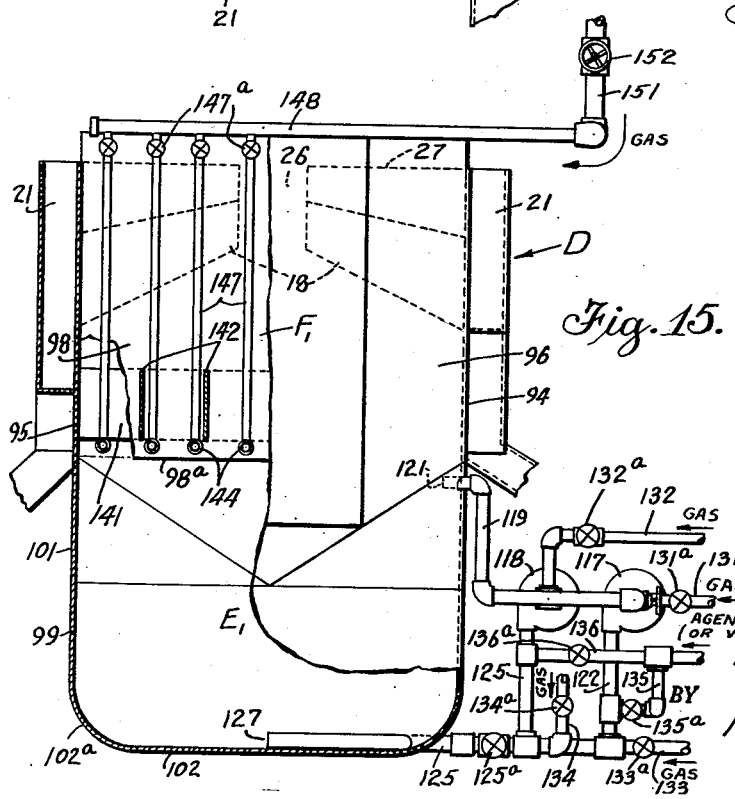
Fig. 15 is a transverse sectional view on line 15—15 in Fig. 13, with certain parts shown in end elevation.

Figs. 13 to 15 illustrate another modified form of apparatus, in which the pulp in each agitation chamber is caused to circulate about a vertical axis instead of a horizontal axis, the circulation being in this case also produced by continually withdrawing and returning portions of the pulp by the action of pumps, preferably located outside the tank as shown.

Referring to these figures, the upper portion of the horizontally elongated tank D is of rectangular shape, having vertical side walls 94 and 95 and end walls 96 and 97, and this upper portion of the tank is divided by longitudinally spaced transverse vertical upper partitions 98 into a plurality of bubble separation and froth formation chambers or zones such as indicated at $F_1$, $F_2$, $F_3$—$F_x$. The lower portion of the tank is formed by a plurality of contiguously arranged agitation sections having vertically extending lower wall portions 99 of cylindrical shape whose diameter is approximately equal to the width of the upper portion of the tank and also equal to the spacing between adjacent upper partitions 98, and suitably formed transformation portions 101 joining the cylindrical portions 99 to the rectangular upper portion of the tank. The bottom walls 102 of these agitation sections combine to form the bottom wall of the tank and are preferably provided with curved inwardly concave peripheral portions 102a joining the cylindrical wall portions 99.

These generally cylindrical agitation sections are arranged with the upper edges of the transformation portions 101 tightly joined to the side walls 94 and 95 and, in the case of the two end sections to the end walls 96 and 97 respectively, and thus form part of the side and end walls of the tank. The tank is provided at one end with a pulp feed compartment 104 opening into the upper portion of the first agitation section through an opening 105 in one end wall of the tank, and is provided at the other end with openings 106 and 107, having adjustable gates 106a and 107a, for discharging tailings into a tailings discharge compartment or launder 108. As before, the upper edge of gate 106a defines a tailings overflow lip near the top of the tank for maintaining the desired pulp level in the upper portion of the tank, adjacent but slightly below the froth overflow level L''.

The walls of adjacent agitation sections are tightly joined together at their upper edges as indicated at 109, and form lower transverse partitions as indicated at 111, dividing the lower portion of the tank into a plurality of successive pulp agitation chambers $E_1$, $E_2$, $E_3$—$E_x$. These lower transverse partitions are preferably extended upward above the lower edges 98a of the upper partitions 98, by means of auxiliary partition members or portions 111b extending transversely between the side walls 94 and 95, and joined to the upper edges of the adjoining agitation sections and extending upwardly therefrom. The upper edges 111a of the lower partitions 111 are thus somewhat above the lower edges of the upper partitions, but a substantial distance below the froth overflow level indicated at L'', and also a substantial distance below the pulp level in the tank so as to permit longitudinal movement of pulp over the top of the lower partitions, through the bubble separation and froth formation chambers, from one agitation chamber to the next.

The upper partitions 98 are located above and at approximately the mid-length of the respective pulp agitation chambers and extend diametrically with respect thereto, the lower edges 98a of said partitions being spaced a substantial distance above the bottom walls 102 of the agitation chambers, so as to permit a general longitudinal movement of pulp beneath the upper partitions, through the agitation chambers, from one bubble separation and froth formation chamber to the next, and to also permit active circulating movement of pulp in each agitation chamber. The upper edges of partitions 98 and end walls 96 and 97 preferably extend somewhat above the froth overflow level L''.

In this form of apparatus, the pulp agitation chambers are all of equal length, as determined by the diameter of the cylindrical lower wall portions 99, while the first and last froth separation chambers $F_1$ and $F_x$ are each half the length of the intervening chambers such as $F_2$ and $F_3$. It will be understood that the tank may be of desired length and transverse dimensions, as indicated by the break therein at 115, and may be provided with any desired number of successive agitating chambers and bubble separating and froth formation chambers. This apparatus is also particularly advantageous for the treatment of a large amount of material in a single machine, and the above comments as to examples of dimensions that may be employed in a large capacity machine are also applicable to this form of apparatus.

This apparatus is also shown as provided with froth overflow means like those above described, including spaced transverse troughs 13 in the upper portion of the bubble separation and froth formation chambers, and side launders 21, the overflow lips 27 of said troughs being at the froth overflow level L''.

The means for circulating and agitating the pulp in each agitation chamber comprises a series of pumps, which are shown as located outside the tank along one side thereof. At least one such pump is provided for each agitation chamber, and I have shown two pumps 117 and 118 for each chamber, each pump being connected to the agitation chamber by a piping system for continually withdrawing and returning portions of the pulp. The following description refers particularly to the pumps and piping systems for the first agitation chamber $E_1$ and it will be understood that the pumps and piping systems for the other agitation chambers are similar and are connected in the same manner to the corresponding chambers.

The piping system for pump 117 comprises a pulp withdrawal line 119 connected to the pump inlet and extending into the tank and opening into the agitation chamber $E_1$ at a substantial distance above the bottom thereof and preferably in the upper portion of the agitation chamber, through a pulp withdrawal opening 121. The pulp withdrawal opening 121 is located adjacent the periphery of the upper portion of chamber $E_1$, in a direction generally tangential to the periphery of the cylindrical wall portion 99. The outlet of pump 117 is connected to a pulp return line 122 which also extends through a wall tank and opens into the chamber $E_1$ through a pulp withdrawal opening 123 closely adjacent the bottom wall 102, in a direction substantially tangent to a circle about the vertical axis of a cylindrical wall portion 99 at the position of said opening. The pulp return opening 123 is preferably located in the outer portion of the chamber $E_1$ at a substantial distance from the axis thereof, and is shown as located just inwardly of the curved bottom wall portion 102a. The piping system for the other pump 118 similarly comprises pulp withdrawal and pulp return lines 124 and 125 connected to the pump inlet and outlet respectively and extending within the tank and opening into chamber $E_1$ through pulp withdrawal and pulp return openings 126 and 127 respectively. The location and direction of the openings 126 and 127 are similar to those of openings 121 and 123, except that they are located somewhat inwardly from the respective openings 121 and 123 so as to withdraw and return portions of pulp at positions nearer the vertical axis of the generally cylindrical agitation chamber. The pulp withdrawal openings 121 and 126 are located below the bubble separation and froth formation chambers, at a substantial distance below the level of the tailings discharge lip.

The pulp withdrawal and pulp return lines for each pump are provided with valves as indicated at 119a, 122a, 124a, 125a. The two pulp withdrawal lines 119 and 124 are interconnected by a pipe 128 provided with a valve 128a, and the two pulp return lines 122 and 125 are interconnected by a pipe 129 provided with a valve 129a, in the same manner and for the same general purposes as described above in connection with the interconnections between adjacent pairs of pumps in Figs. 1 to 8.

Gas supply pipes 131, 132, 133 and 134, provided with valves 131a, 132a, 133a and 134a are connected to a source of compressed air or other gas and to the lines 119, 124, 122 and 125, respectively, for introducing gas into the pulp in these lines, either ahead or beyond the pumps or both.

Pipes 135 and 136 provided with valves 135a and 136a are also connected to the pulp return lines 122 and 125 respectively, for introducing suitable flotation agents into these lines as described above, or for introducing water under pressure for the purpose of discharging and suspending solids that are accumulated in the bottom of the chamber $E_1$ in the event of a prolonged shut down while the tank is full of pulp.

It will be understood that either or both of the pumps 117 and 118 may be operated continually to withdraw pulp from the agitation chamber and return it forcibly thereto, and that the recirculation of the pulp in this manner by either or both of the pumps will maintain effective agitation of the pulp in each agitation chamber by active circulatory movement, principally in generally circular or annular paths about the vertical axis of each chamber, as indicated by the curved arrows in the chamber $E_1$ in Fig. 14, a portion of the circulating pulp being continually withdrawn through openings 121 and/or 126 and returned through openings 123 and/or 127. Since the pulp return openings 123 and 127 are located at the bottom of the chamber and are directed substantially parallel to the bottom wall 102, the entire body of pulp in the agitation chamber is kept in motion at sufficient velocity to prevent settling and accumulation of solids at the bottom of the tank and to maintain the solid particles in suspension in the pulp.

The apparatus is also provided with a set of vertical baffles located below the pulp level in the tank, immediately above each of the pulp agitation chambers and at a substantial distance below the froth overflow level L'', which cooperate with the upper transverse partitions 98 to prevent the above described circulatory movement of the pulp from persisting upwardly within the bubble separation and froth formation chambers, while permitting upward movement of gas bubbles with attached solids and also permitting movement of the pulp between these baffles in passing successively into and through the alternately arranged pulp agitation chambers and bubble separation and froth formation chambers. Each of these sets of baffles preferably comprises a plurality of longitudinally spaced baffles 141 extending transversely of the tank, and a plurality of transversely spaced baffles 142 extending longitudinally of the tank, in the lower portion of each bubble separation and froth formation chamber $F_1$, $F_2$, et cetera. The upper edges of these baffles are spaced below, the bottom of the froth overflow troughs 18, preferably at approximately the same level as the upper edges 111a of the lower transverse partitions 111.

The apparatus is also provided with means for introducing gas into the pulp in the upper portion of each pulp agitation chamber, including perforated gas delivery pipes 144 extending across the agitation chamber and spaced from each other, and each provided with a plurality of spaced small gas outlet openings 145. The pipes 144 are shown as extending longitudinally of the tank, each pipe being closed at both ends as at 146 and being connected at an intermediate point to a vertical pipe 147 extending upward to a position above the top of the tank, where it is connected through a control valve 147a to a gas supply pipe 148 extending across the top of the tank. The several gas supply pipes 148 are connected by pipe 149 to a main gas supply line 151 which is preferably provided with a shut off valve 152 and is connected to a source of air or other gas at suitable pressure.

Figure 17:
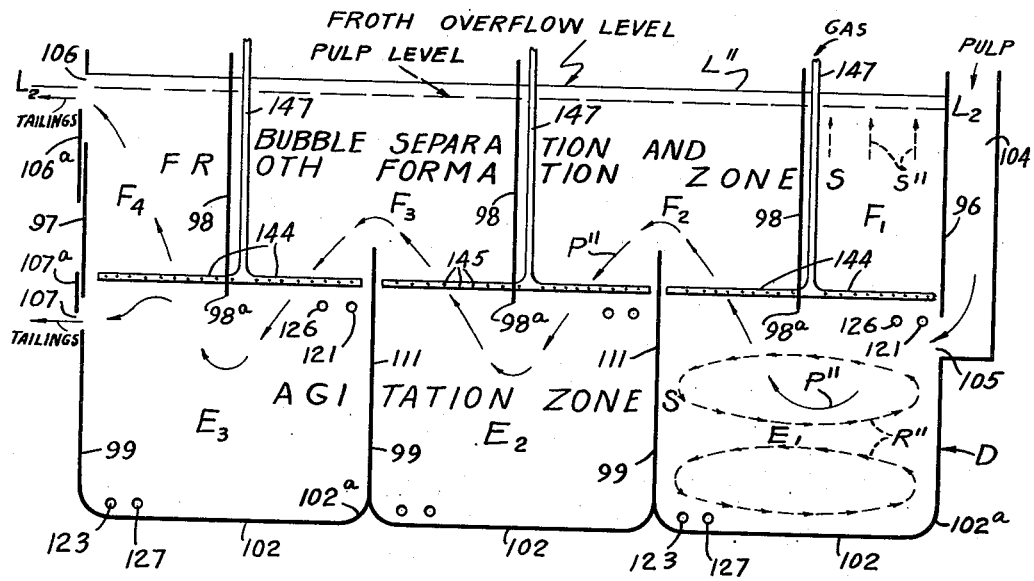
Fig. 17 is a schematic view similar to Fig. 16 of an apparatus of the type shown in Fig. 13.

The operation of the above forms of apparatus will be understood from the above description and from the following description of the process according to my invention as carried out in such apparatus, reference being had to the drawings showing the diffeernt forms of apparatus and also to the schematic showings in Figs. 16 and 17.

Fig. 16 is a somewhat schematic longitudinal vertical section of an apparatus of the type shown in Figs. 1 to 8, illustrating the general linear flow of pulp therethrough, the circulatory movement of pulp in the agitation chambers and the rising of bubbles to form a froth in the bubble separation and froth formation chambers. For the sake of simplicity of illustration, the froth overflow troughs 18 and the longitudinal baffles 51 are omitted in Fig. 16, and I have shown only three successive agitation chambers $B_1$, $B_2$ and $B_3$ and three successive bubble separation and froth formation chambers $C_1$, $C_2$ and $C_3$. These chambers are arranged in the same manner as in Fig. 1 except that the last chambers $B_3$ and $C_3$ in Fig. 16 correspond to the chambers $B_y$ and $C_y$ in Fig. 1.

The pulp, to be subjected to flotation, and comprising finely divided solids and water and ordinarily containing one or more frothing agents, collecting agents and/or other agents such as are commonly employed in froth flotation, is introduced into one end of the tank through the feed compartment 11 and opening 12 into the tank A, and is caused to flow by gravity in a generally linear movement longitudinally of the tank, passing alternately through the successive agitation zones and bubble separation and froth formation zones, in a sinuous path extending above the lower partitions 31 and beneath the upper partitions 32, as indicated by the series of spaced arrows at P.

The imperforate lower partitions 31 prevent direct flow of pulp from each agitation chambe to the next, but provide an opening extending acros the full width of the tank above each partition, from the top edge 31a thereof to the top of the tank, permitting longitudinal movement of pulp within the corresponding bubble separation and froth formation zone. In a similar manner, the imperforate upper partitions 32 prevent direct flow of pulp from each bubble separation and froth formation chamber to the next, but provide an opening extending across the full width of the tank below each partition, from the bottom edge 32a thereof to the bottom of the tank, permitting longitudinal movement of pulp with the corresponding agitation chamber. The pulp flow openings thus provided above the lower partitions and below the upper partitions may be unobstructed, as shown in Fig. 1 and in chambers $C_1$ and $B_2$ in Fig. 16. However, it is within the scope of my invention to provide additional baffle means for partially restricting the flow of pulp through these openings so as to modify or control the distribution of the flow of pulp therethrough. For example, baffle means in the form of a perforate partition 31b having spaced perforations 31c may be provided above any one or more of the lower partitions 31, as illustrated in the case of the second partition 31 in Fig. 16, to partially restrict longitudinal movement of pulp through the corresponding bubble separation and froth formation chamber, such as $C_2$ in this case, and thus cause the longitudinal flow to be distributed more evenly throughout the height of that chamber above the imperforate partition 31. Similarly, baffle means in the form of a perforate partition 32b' having spaced perforations 32c may be provided below any one or more of the upper partitions 32, as illustrated in the case of the second partition 32 in Fig. 16, to partially restrict longitudinal movement of pulp through the corresponing agitation chamber, such as B₃ in this case.

The pulp entering each agitation chamber is agitated and circulated therein in annular paths generally transverse to the length of the tank as described above and as indicated by the arrows at R in chamber B₁ in Fig. 16, and is brought into intimate contact with gas bubbles formed by introduction of gas into the pulp within the agitation chambers as described above, to cause selective attachment of certain solid particles to the gas bubbles. The gas is supplied principally through the gas delivery pipes 54, but gas may also be supplied to the pulp circulating lines of the pumps, as previously described, and additional flotation agents may also be introduced into these circulating lines as also described above. This circulatory movement of pulp in each agitation chamber is superimposed upon the general linear flow of pulp therethrough, so that the actual motion of the pulp is the resultant of the two components indicated by the solid arrows P and the dotted arrows R.

Some of the gas bubbles carrying attached solid particles rise upwardly out of the agitation chambers and through the bubble separation and froth formation chambers, as indicated by the dotted arrows at S in chamber C, and are discharged by overflow at the froth overflow level L. It will be apparent from Fig. 16 that the bubbles from the agitation chamber B₁ and the first half of chamber B₂ will pass upwardly into the first bubble separation and froth formation chamber C₂ and will collect to form a froth that is removed at the top of the body of pulp in that chamber, and that similar conditions will prevail in the other agitation chambers and the other bubble separation and froth formation chambers, the bubbles rising from the second half of the last agitation chamber B₃ passing upwardly through the last bubble separation and froth formation chamber C₃ and forming a froth which is collected and removed from that chamber. As the pulp passes longitudinally of the tank through each bubble separation and froth formation chamber, in passing from one agitation zone to the next, additional bubbles and attached solids rise and are discharged in the froth overflowing at the top of that chamber.

The tailings, comprising the liquid and solid constituents of the pulp that are not floated and removed by overflow in the froth as described above, are discharged at the other end of the tank, principally through the upper discharge opening 14. In order to prevent undesirable accumulation of solids in the tank adjacent the tailings discharge end, a portion of the tailings may also be discharged from the last agitation chamber B₃ through the lower discharge opening 15. The gate 15a shown in Fig. 1 may be adjusted to control the proportion of tailings discharged through the lower opening 15 and to cause the major portion of the tailings to pass upward through the central portion of the last bubble separation and froth formation chamber and over the gate 14a shown in Fig. 1, so that by adjustment of gate 14a the pulp level within the tank may be maintained at a desired level adjacent but slightly below the froth overflow level L, and a substantial distance above the bottom of the bubble separation and froth formation zones, as indicated for example by the line L₁—L₁ in Figs. 4 and 16.

The process may be carried out in substantially the same manner in the form of apparatus shown in Figs. 9 to 12, except for the difference in the circulatory movement of the pulp in the agitation chambers, resulting from the different location of the pulp withdrawal and pulp return openings and the difference in the shape of the lower portion of the tank, as brought out above in the description of that form of apparatus.

The process may also be carried out in a generally similar manner in the form of apparatus shown in Figs. 13 to 15. Fig. 17 is a schematic illustration of an apparatus of this type comprising three successive agitation chambers E₁, E₂ and E₃, and four successive bubble separation and froth formation chambers F₁, F₂, F₃ and F₄, arranged in the same manner as in Fig. 13 except that the last chambers E₃ and F₄ in Fig. 17 correspond to the chambers Eₓ and Fₓ in Fig. 13. In this case also, the froth overflow troughs 18 and the baffles 141 and 142 are omitted in the schematic showing.

In this form of apparatus the pulp is again introduced at one end of the tank through the feed compartment 104 and opening 105. The general linear movement of the pulp longitudinally of the tank, alternately through the successive agitation zones and bubble separation and froth formation zones, also follows a sinuous path extending below the upper partitions 98 and above the lower partitions 111, as indicated by the solid arrows at P″, while the circulation of the pulp in each agitation chamber follows generally circular or annular paths about a vertical axis substantially centrally of that chamber, as indicated by the dotted arrows at R″ in chamber E₁. As before, this circulatory movement in each agitation chamber is superimposed upon the general linear flow of pulp therethrough so that the actual motion of the pulp is the resultant of the two components of movement described above.

The gas bubbles with attached solid particles rise through the bubble separation and froth formation chambers to form a froth which is discharged by overflow at the froth overflow level L″. This upward flow of gas bubbles and froth is indicated by the dotted arrows at S″, and it will be noted that the bubbles rising from the first half of the first agitation chamber will pass upwardly into the first bubble separation and froth formation chamber F₁ and will collect to form a froth that is removed at the top of the body of pulp in that chamber. The bubbles that rise upwardly between adjacent pairs of upper partitions 98 are discharged in the form of froth at the top of the intermediate bubble separation and froth formation chambers F₂ and F₃, while the bubbles rising beyond the last partition 98 are similarly discharged at the top of the last chamber F₄.

The tailings are discharged in the same manner as before at the other end of the tank, and the gate 106a is adjusted to maintain the desired pulp level, as indicated for example at L₂—L₂, adjacent but slightly below the froth overflow level L″.

Due to the active circulation and agitation of the pulp by pump action in each of the agitation chambers of any of the above forms of apparatus, a relatively high concentration of solids may be maintained in these chambers, which is of great advantage in promoting contact of the solid particles with added flotation agents and with gas bubbles formed by introduction of gas into the pulp. The resulting high pulp density is of added benefit in further decreasing the settling rate of individual solid particles. Furthermore, by introducing flotation agents into the pulp in these lower zones of high solids concentration or pulp density, in which the proportion of liquid to solids is relatively low, a high concentration of such agents may be maintained in the liquid phase in these zones, thus further enhancing the effectiveness of these agents in promoting the attachment of desired solid particles to the gas bubbles.

A portion of the pulp is continually removed from each agitation chamber by the general longitudinal component of flow, and is positively directed into and caused to pass through a succeeding bubble separation and froth formation chamber. However, the transverse partitions and baffles, as described above, prevent the circulatory agitating movement of the pulp from persisting upward into the bubble separation and froth formation chambers, so that a relatively quiescent condition is maintained therein, promoting the upward movement of gas bubbles with attached solid particles and the settling of solid particles that are not attached to gas bubbles. Due to the relatively low degree of agitation in the bubble separation and froth formation chambers, the proportion of unattached solids maintained in suspension in the liquid therein is relatively low, and the resulting low solids content or pulp density in these upper zones further promotes the settling of such solids and the formation and removal of a froth containing the gas bubbles and attached solids.

The concentration of solids in the agitation zones is dependent upon the depth of these zones of active agitation as compared with the total depth of the body of pulp in the tank, which is in turn dependent upon the level of the pulp withdrawal openings in relation to the bottom of the tank and to the pulp level such as $L_1$—$L_1$ or $L_2$—$L_2$. Thus, the concentration of pulp in the agitation zones may be controlled by placing the pulp withdrawal openings, such as 40 or 121, 126, at the most desirable level or, in the form of apparatus shown in Figs. 9 to 12, by vertically adjusting the pulp withdrawal pipe sections 78a to adjust the level of the openings 79a. In all cases, however, these pulp withdrawal openings are within the lower agitation zones and a substantial distance below the tailings overflow lip and the pulp level.

It will be seen, therefore, that the pulp is passed through upper bubble separation and froth formation zones of relatively low pulp density, superimposed above and in unobstructed communication with the lower agitation zones, and that an advantageous difference in pulp density is maintained in the upper and lower zones. In conventional types of flotation apparatus the pulp density may be in the neighborhood of 20 to 30% solids, whereas in my apparatus, if the feed pulp has a solids content within this range, pulp density of from 40 to 75% solids may be maintained in the lower agitation zones as compared with about 5 to 15% solids in the pulp in the upper bubble separation and froth formation zones.

The consumption of air or other gas is also relatively low as compared with other forms of flotation apparatus, since only the necessary amount of gas for bubble formation and production of froth is required. The use of pump means to effect active agitation and suspension of solids in the lower agitation zones eliminates the necessity of introducing additional air or other gas for agitating or circulating the pulp.

The upward movement of gas bubbles and the formation and separation of froth by the preferred form of froth overflow means described above are illustrated schematically in Fig. 4, in which I have shown portions of two adjacent troughs 18 defining therebetween a vertically extending passage 25, and provided at their upper ends with froth overflow lips 27 at the froth overflow level such as L. Due to the above described formation of the trough side walls 23, the width and cross-sectional area of the passage 25 decrease upwardly to the restricted throat 25a and then increase upwardly to the froth overflow level at the top of the troughs. As the gas bubbles, indicated at $T_1$, rise through the pulp toward the restricted throat 25a they are crowded closer together and, due to their upward velocity as they rise above this restricted throat, they tend to move upward principally in the central portion of the divergent upper portion of the passage, as indicated at $T_2$.

The level of the pulp is maintained slightly below the froth overflow level and above the restricted throat 25a, as indicated for example, at $L_1$—$L_1$. The bubbles rising in the central portion of the passage between the troughs escape from the pulp and form a froth, as indicated at $T_3$. Since the formation of this froth occurs principally in the central portion of the space between the lips 27, the froth tends to build up at this position to a height slightly above the lips 27, and then to move laterally outward toward the lips, as indicated by the arrows above the froth in Fig. 4, and to flow over the lips and into the troughs. This produces a positive discharge and overflow of the froth. Furthermore, the lateral outward movement of the froth provides a further opportunity for any unattached gangue particles that may have been entrained mechanically and carried upward by the rising bubbles to drop out of the froth and fall back into the body of pulp, as indicated by the arrows at U.

The relatively great total length of the overflow lips 27 of the transversely extending troughs 18 enables a large quantity of froth to be discharged at the top of each bubble separation and froth formation chamber, without causing the froth to pile up and flow over the lips in streams of considerable depth, as would be the case if it were attempted to discharge the same quantity of froth by overflowing only at the upper edges of the walls of the tank. This leads to the production of a froth product or concentrate of uniform high quality at a high rate, so that in an apparatus of large dimensions and high throughput capacity, the froth discharge capacity may be made commensurate with the ability of the apparatus to produce a froth by agitation and aeration of the pulp.

I claim:

1. In a froth flotation apparatus, the combination comprising: a horizontally elongated tank having pulp feed means at one end, tailings discharge means at the other end, and froth discharge means at the upper portion of the tank providing horizontal froth overflow lips distributed along the length of the tank; said tailings discharge means including means defining a tailings overflow lip near the top of the tank for maintaining therein a pulp level adjacent but slightly below the level of the froth overflow lips; a plurality of longitudinally spaced transverse lower partitions within the tank, each extending across the width of the tank and extending upward from the bottom of the tank to an intermediate level spaced a substantial distance below the level of said tailings overflow lip so as to divide the lower portion of the tank into a plurality of successive pulp agitation chambers while providing openings above said partitions for longitudinal flow of pulp; the upper portion of the tank having walls defining a bubble separation and froth formation space therein overlying and opening directly into the upper ends of said agitation chambers for free communication therewith, and extending upwardly therefrom to said froth overflow lips; means for agitating pulp in each of said agitation chambers, comprising a pump connected to the corresponding chamber to withdraw pulp therefrom at one position and to return it thereto at a different position; the positions at which the pulp is withdrawn from and returned to each agitation chamber by the corresponding pump, and the direction in which the return connection of each pump opens into the corresponding agitation chamber, being such as to maintain active circulation of pulp in the respective agitation chambers, in paths that extend into the upper portions of said chambers but below said bubble separation and froth formation space; and means for introducing gas under pressure into the pulp at a plurality of distributed positions within the upper portion of each agitation chamber, within said paths of pulp circulation and below said bubble separation and froth formation space.

2. In a flotation apparatus, the combination as set forth in claim 1, and also comprising a plurality of complementary transverse upper partitions disposed within the tank intermediate the lower partitions, each extending across the width of the tank and extending from the level of said froth overflow lips downward to below the level of the upper ends of the lower partitions so as to divide the upper portion of the tank into a plurality of bubble separation and froth formation chambers while providing openings below the upper partitions for longitudinal flow of pulp; said means for introducing gas into the pulp being located at positions adjacent the level of the lower ends of said transverse upper partitions.

3. In a froth flotation apparatus, the combination comprising: a horizontally elongated tank having pulp feed means at one end, tailings discharge means at the other end, and froth discharge means at the upper portion of the tank providing horizontal froth overflow lips distributed along the length of the tank; said tailings discharge means including means defining a tailings overflow lip near the top of the tank for maintaining therein a pulp level adjacent but slightly below the level of the froth overflow lips; a plurality of longitudinally spaced transverse lower partitions within the tank, each extending across the width of the tank and extending upward from the bottom of the tank to an intermediate level spaced a substantial distance below the level of said tailings overflow lip so as to divide the lower portion of the tank into a plurality of successive pulp agitation chambers while providing openings above said partitions for longitudinal flow of pulp; the upper portion of the tank having walls defining a bubble separation and froth formation space therein overlying and opening directly into the upper ends of said agitation chambers for free communication therewith, and extending upwardly therefrom to said froth overflow lips; means for agitating pulp in each of said agitation chambers, comprising a pump connected to the corresponding chamber to withdraw pulp therefrom at one position and to return it thereto at a different position; and means for introducing gas under pressure into the pulp at a plurality of distributed positions within the upper portion of each agitation chamber and below said bubble separation and froth formation space; the inlet of each pump being connected to the corresponding agitation chamber at a pulp withdrawal opening located a substantial distance above the bottom thereof and a substantial distance below the level of the tailings overflow lip, and the outlet of each pump being connected to the corresponding agitation chamber at a pulp return opening adjacent the bottom thereof.

4. In a flotation apparatus, the combination as set forth in claim 3, in which the connection from the outlet of each pump to the pulp return opening opens into the agitation chamber in a direction substantially parallel to the bottom wall of the tank.

5. In a flotation apparatus, the combination as set forth in claim 3, in which the connection from the outlet of each pump to the pulp return opening opens into the agitation chamber in a direction transverse to the length of the tank so as to cause circulation of pulp within the agitation chamber about an axis extending longitudinally of the tank.

6. In a flotation apparatus, the combination as set forth in claim 3, in which said gas introducing means communicates with the interior of the tank at positions adjacent the level of the pulp withdrawal opening of each agitation chamber.

7. In a froth flotation apparatus, the combination comprising: a horizontally elongated tank having pulp feed means at one end, tailings discharge means at the other end, and froth discharge means at the upper portion of the tank providing horizontal froth overflow lips distributed along the length of the tank; said tailings discharge means including means defining a tailings overflow lip near the top of the tank for maintaining therein a pulp level adjacent but slightly below the level of the froth overflow lips; a plurality of longitudinally spaced transverse lower partitions within the tank, each extending across the width of the tank and extending upward from the bottom of the tank to an intermediate level spaced a substantial distance below the level of said tailings overflow lip so as to divide the lower portion of the tank into a plurality of successive pulp agitation chambers while providing openings above said partitions for longitudinal flow of pulp; the upper portion of the tank having walls defining a bubble separation and froth formation space therein overlying and opening directly into the upper ends of said agitation chambers for free communication therewith, and extending upwardly therefrom to said froth overflow lips; means for agitating pulp in each of said agitation chambers, comprising a pump connected to the corresponding chamber to withdraw pulp therefrom at one position and to return it thereto at a different position; and means for introducing gas under pressure into the pulp at a plurality of distributed positions within the upper portion of each agitation chamber and below said bubble separation and froth formation space; said froth discharge means comprising a plurality of troughs extending inward from each side of the tank and transverse to the length of the tank; each trough extending downward within the bubble separation and froth formation space to a position below the level of said tailings overflow lip, and having two spaced side walls terminating at their upper edges in froth overflow lips extending transversely of the tank; a side wall of each trough being spaced from a side wall of an adjacent trough to permit upward movement of bubbles through the pulp and formation of froth between the troughs; the spaced side walls of adjacent troughs converging upwardly from their bottom edges to provide a restricted throat therebetween at a position intermediate the height of the troughs and below the pulp level maintained in the tank by said tailings overflow lip, and then diverging upwardly from said restricted throat to said froth overflow lips.

8. In a flotation apparatus, the combination comprising: a horizontally elongated tank having pulp feed means at one end and tailings discharge means at the other end; means for agitating pulp in the lower portion of the tank; means for introducing gas under pressure into the pulp at distributed positions at an intermediate level in the tank to aerate the pulp and cause formation of a froth at the top of the tank; and froth discharge means in the upper portion of the tank comprising a plurality of troughs extending inward from each side of the tank and transverse to the length of the tank, each trough having two spaced side walls terminating at their upper edges in horizontal froth overflow lips extending transversely of the tank, and a side wall of each trough being spaced from a side wall of an adjacent trough to permit upward movement of gas bubbles through the pulp and formation of froth between the troughs; said tailings discharge means including means defining a tailings overflow lip near the top of the tank for maintaining therein a pulp level adjacent but slightly below the level of the froth overflow lips and above the bottom of the froth discharge troughs; the spaced side walls of adjacent troughs converting upwardly from their bottom edges to provide a restricted throat at a position intermediate the height of the troughs and below the pulp level maintained in the tank by said tailings overflow lip and then diverging upwardly from said restricted throat to said froth overflow lips.

9. In a froth flotation apparatus, the combination comprising: a tank having pulp feed means at one end, tailings discharge means at the other end, an agitation chamber in the lower portion of the tank, and a bubble separating and froth formation chamber overlying and opening directly into the upper end of the agitation chamber for free communication therewith; said tailings discharge means including means defining a tailings overflow lip near the top of the tank for maintaining therein a pulp level spaced a substantial distance above the bottom of the bubble separation and froth formation chamber; means for agitating pulp in said agitation chamber, comprising a pump connected to said agitation chamber to withdraw pulp therefrom at one position and to return it thereto at a different position; means for introducing gas under pressure into the pulp at a plurality of distributed positions within the upper portion of said agitation chamber and below said bubble separation and froth formation chamber; and froth overflow means at the top of said bubble separation and froth formation chamber; the inlet of said pump being connected to the agitation chamber at a pulp withdrawal opening located a substantial distance above the bottom thereof and a substantial distance below the level of the tailings overflow lip, and the outlet of said pump being connected to said chamber at a pulp return opening adjacent the bottom thereof.

10. In a froth flotation apparatus, the combination as set forth in claim 9, in which the connection from the outlet of the pump to the pulp return opening opens into the agitation chamber in a direction substantially parallel to the bottom wall of the tank.

11. In a froth flotation apparatus, the combination as set forth in claim 9, in which the connection from the outlet of the pump to the pulp return opening opens into the agitation chamber in such direction as to maintain active swirling movement of pulp in an annular path within said chamber.

12. In a froth flotation apparatus, the combination as set forth in claim 11, and also comprising a plurality of spaced vertically extending baffles within said tank above the agitation chamber and adjacent the bottom of the bubble separation and froth formation chamber, said baffles extending transverse to the path of swirling movement of pulp in the agitation chamber.

13. In a froth flotation process, the steps which comprise: passing pulp comprising liquid and suspended solid particles in a generally linear flow through a plurality of successive agitation zones and a plurality of bubble separation and froth formation zones overlying and communicating directly with the upper ends of the agitation zones; positively directing the pulp to flow alternately through the agitation zones and the bubble separation and froth formation zones in such manner that the pulp passes from an agitation zone into a bubble separation and froth formation zone and from a bubble separation and froth formation zone into an agitation zone; maintaining a pulp level a substantial distance above the bottom of said bubble separation and froth formation zones; maintaining active swirling movement of pulp in each agitation zone in a generally annular path extending into the upper portions of such zone; introducing gas under pressure at a plurality of positions in the upper portion of each agitation zone, within such path of swirling movement of the pulp, to aerate the pulp therein and cause gas bubbles with attached solid particles to rise through the pulp and form a froth in each bubble separation and froth formation zone; and removing the froth by overflow at the top of the bubble separation and froth formation zones.

14. In a froth flotation process, the steps as set forth in claim 13, in which the active circulatory movement of pulp in each agitation zone is maintained by withdrawing pulp therefrom at a substantial distance above the bottom of said zone and forcibly reintroducing the withdrawn pulp thereto adjacent the bottom of said zone.

15. In a froth flotation process, the steps which comprise: passing pulp comprising liquid and suspended solid particles in a generally linear flow through a plurality of successive agitation zones and a plurality of bubble separation and froth formation zones overlying and communicating directly with the upper ends of the agitation zones; positively directing the pulp to flow alternately through the agitation zones and the bubble separation and froth formation zones in such manner that the pulp passes from an agitation zone into a bubble separation and froth formation zone and from a bubble separation and froth formation zone into an agitation zone; maintaining a pulp level a substantial distance above the bottom of said bubble separation and froth formation zones; producing active agitation of the pulp in the respective agitation zones to maintain the solid particles in suspension in the liquid while maintaining a relatively high pulp density in such zones; introducing gas under pressure in the upper portions of the agitation zones to aerate the pulp therein and cause gas bubbles with attached solid particles to pass upwardly out of the agitation zones, and to rise through the pulp in the bubble separation and froth formation zones and form a froth in the upper portions thereof; and maintaining a relatively quiescent condition in the pulp in the bubble separation and froth formation zones, to maintain a relatively low pulp density in the bubble separation and froth formation zones, and to promote the downward movement of unattached solid particles therefrom into the upper portions of the agitation zones.

References Cited in the file of this patent

UNITED STATES PATENTS

| Number | Name | Date |
|---|---|---|
| 1,167,835 | Norris | Jan. 11, 1916 |
| 1,219,089 | Dunn | Mar. 13, 1917 |
| 1,283,159 | Groch | Oct. 29, 1918 |
| 1,310,051 | Blomfield | July 15, 1919 |
| 1,341,024 | Seale et al. | May 25, 1920 |
| 1,352,072 | Lyster | Sept. 7, 1920 |
| 1,415,314 | Colburn et al. | May 9, 1922 |
| 1,440,129 | Borcherdt | Dec. 26, 1922 |
| 1,478,703 | Dolbear | Dec. 25, 1923 |
| 1,547,548 | Allen et al. | July 28, 1925 |
| 2,028,179 | Akins | Jan. 21, 1936 |
| 2,063,751 | Patek | Dec. 8, 1936 |
| 2,072,880 | Hoag | Mar. 9, 1937 |
| 2,142,206 | Patek | Jan. 3, 1939 |
| 2,258,507 | Hoag | Oct. 7, 1941 |
| 2,416,066 | Phelps | Feb. 18, 1947 |

FOREIGN PATENTS

| Number | Country | Date |
|---|---|---|
| 58,314 | Sweden | July 1, 1922 |
| 658,457 | France | June 5, 1929 |
| 639,773 | Germany | May 8, 1936 |